United States Patent [19]
Osborne

[11] 4,089,543
[45] May 16, 1978

[54] BABY CARRIAGE

[76] Inventor: Arnie Osborne, 3810 Laurel Ave., Kansas City, Mo. 64133

[21] Appl. No.: 732,945

[22] Filed: Oct. 15, 1976

Related U.S. Application Data

[63] Continuation-in-part of Ser. No. 637,631, Dec. 4, 1975, abandoned.

[51] Int. Cl.² ............................................. B62B 11/00
[52] U.S. Cl. .................................. 280/647; 280/650; 296/27
[58] Field of Search .......................... 280/37, 647, 680; 296/27; 297/243

[56] References Cited

U.S. PATENT DOCUMENTS

| | | | |
|---|---|---|---|
| 1,075,372 | 10/1913 | Overshiner | 280/37 |
| 1,652,190 | 12/1927 | Wills | 280/37 |
| 2,564,266 | 8/1951 | Linton | 280/57 |
| 3,532,353 | 10/1970 | Rogol | 280/650 |
| 3,612,603 | 10/1971 | Snyder | 280/37 X |

*Primary Examiner*—Robert R. Song
*Attorney, Agent, or Firm*—Lowe, Kokjer, Kircher, Wharton & Bowman

[57] ABSTRACT

A baby carriage stroller has a hollow main body which is mounted on wheels. Parallel pivot arms connect an upper body portion with the main body for movement between an extended upper position and a lower storage position in which the upper body portion is contained within the main body. A foldable main seat assembly is carried on the upper body and a second seat assembly is detachably mounted to an elongate handle by which the carriage may be pushed. The handle folds to a storage position wherein it lies along the main body. A removable canopy structure is included to overlie the main seat assembly.

7 Claims, 11 Drawing Figures

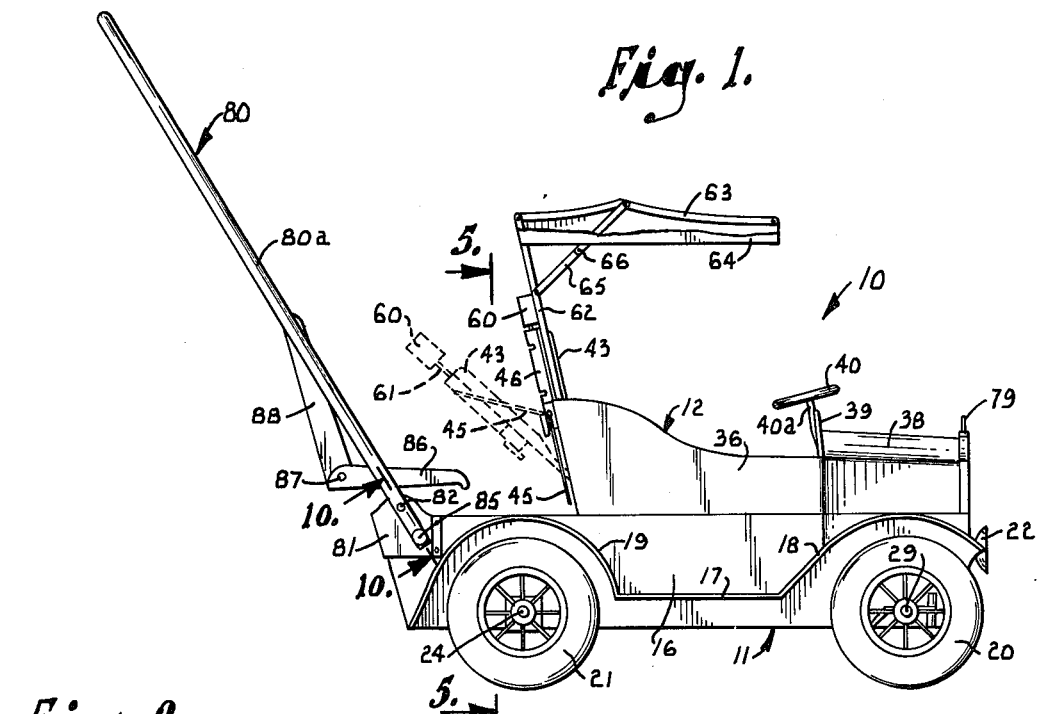
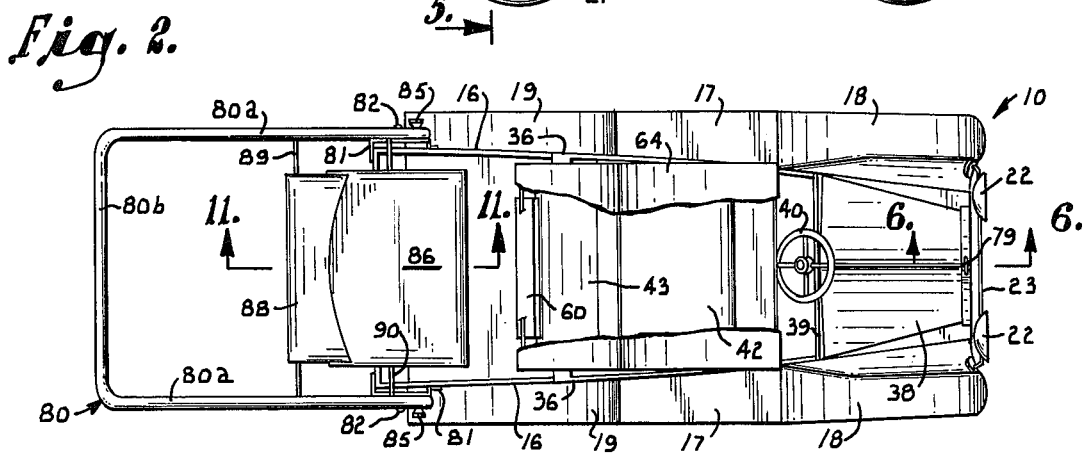
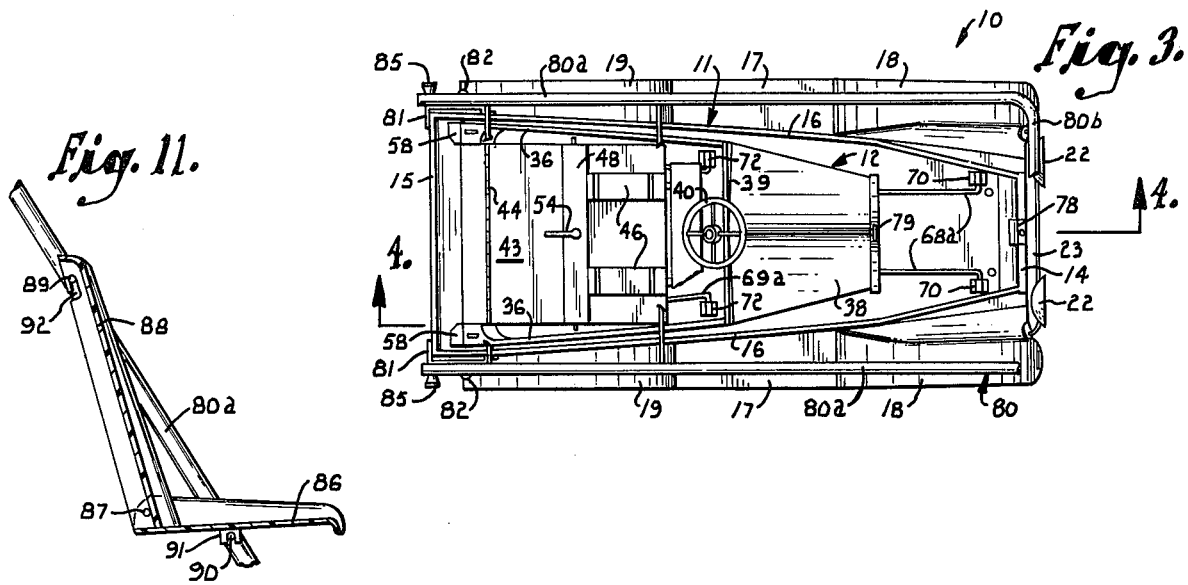

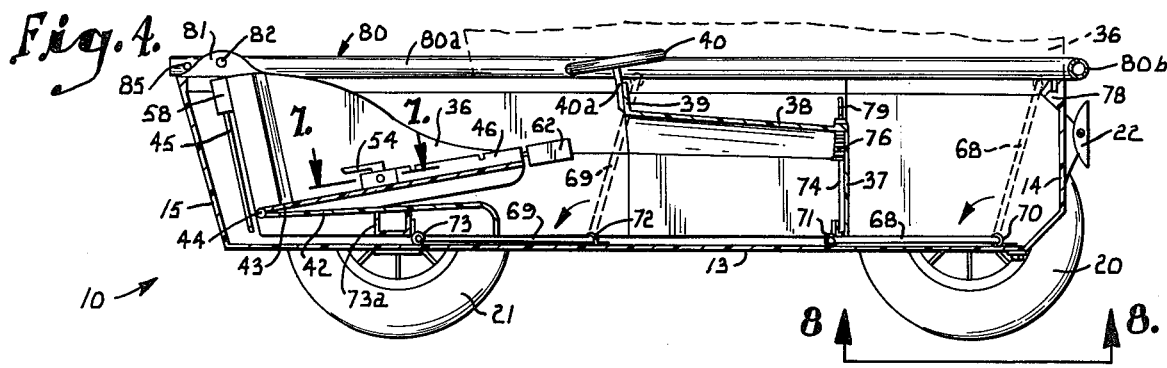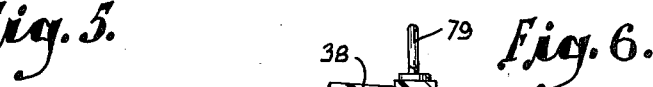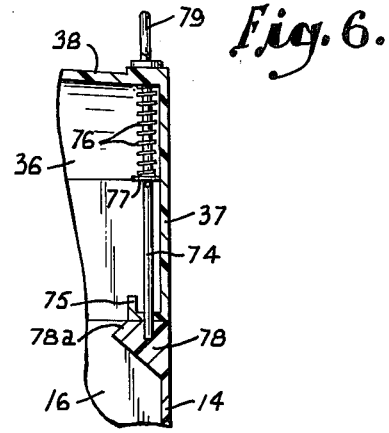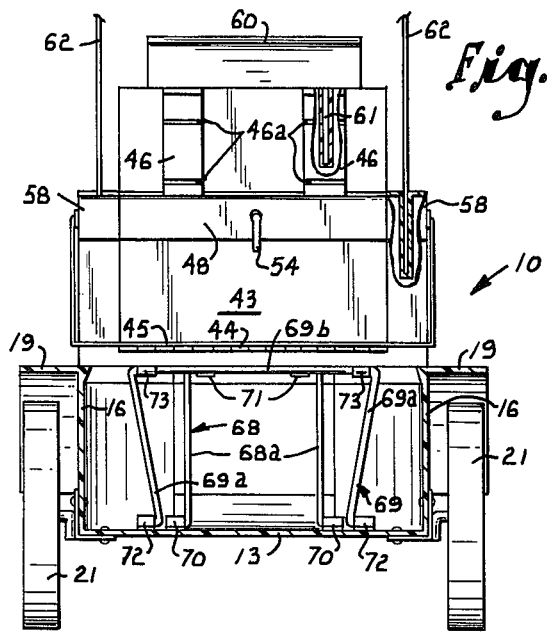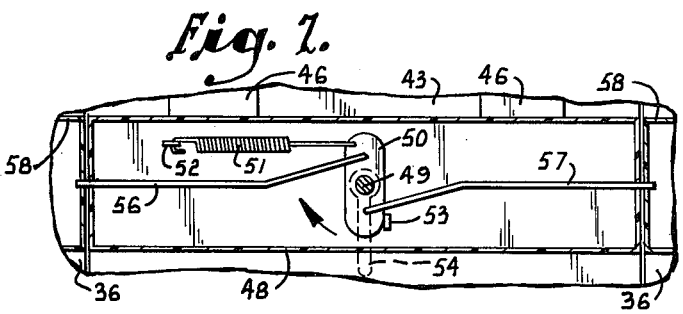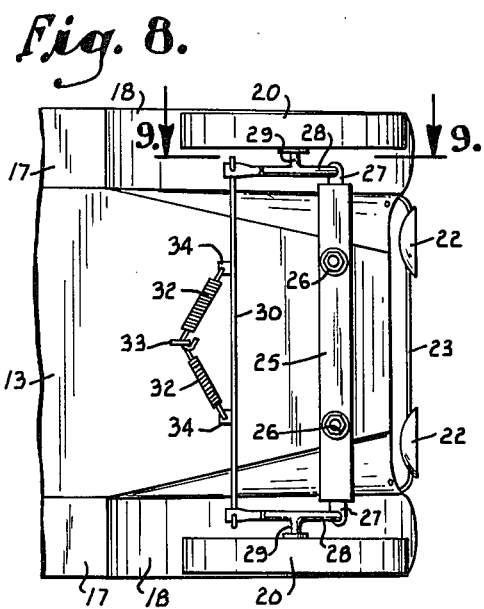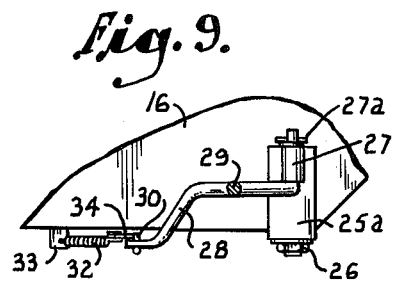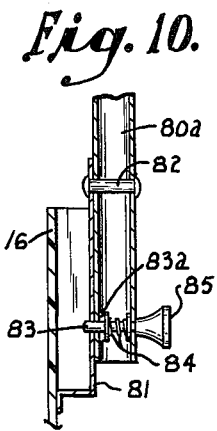

BABY CARRIAGE

BACKGROUND AND SUMMARY OF THE INVENTION

This application is a continuation-in-part of my earlier application Ser. No. 637,631 filed Dec. 4, 1975, now abandoned.

This invention relates generally to baby carriages, and deals more particularly with an improved baby carriage that may be folded up into a low profile storage position in which it occupies little space.

Baby carriages are usually rather large vehicles in order to provide adequate room for one or more infants to be seated comfortably. Due to their size, existing baby carriages require large storage spaces and are difficult to transport in the trunk or back seat of an automobile. It is the principle goal of the present invention to overcome these difficulties by providing a baby carriage which may be folded up to occupy little space when it is to be transported or stored.

More specifically, it is an object of the invention to provide a baby carriage which comprises upper and lower body portions, with the upper portion being retractable within the lower main body to a storage position in which the size of the carriage is reduced considerably.

Another object of the invention is to provide a baby carriage of the character described that includes a parallelogram linkage coupling the upper and lower body sections in a unique manner that allows quick and easy movement between the extended and storage positions.

Still another object of the invention is to provide a baby carriage of the character described in which the upper body portion has a comfortable seat assembly that offers adequate room for accomodating an infant.

A further object of the invention is to provide a baby carriage of the character described wherein the seat assembly is foldable to a storage position.

An additional object of the invention is to provide a baby carriage of the character described that includes a detachable second seat assembly.

Yet another object of the invention is to provide a baby carriage of the character described that includes a detachable canopy structure.

A still further object of the invention is to provide a baby carriage which is attractive in appearance and which is constructed economically yet durably.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views:

FIG. 1 is a side elevational view of a baby carriage constructed according to the present invention, with the carriage in its extended position and the broken lines indicating the back rest for the main seat assembly in a rearwardly inclined position;

FIG. 2 is a top plan view of the baby carriage shown in FIG. 1, with a portion of the canopy broken away for illustrative purposes;

FIG. 3 is a plan view similar to FIG. 2, but showing the carriage in its storage position;

FIG. 4 is a cross sectional view taken generally along line 4—4 of FIG. 3 in the direction of the arrows, with the broken lines indicating the extended positions of the pivot arms;

FIG. 5 is a rear elevational view taken partially in section generally along line 5—5 of FIG. 1 in the direction of the arrows;

FIG. 6 is a fragmentary sectional view on an enlarged scale taken generally along line 6—6 of FIG. 2 in the direction of the arrows;

FIG. 7 is a fragmentary sectional view on an enlarged scale taken generally along line 7—7 of FIG. 4 in the direction of the arrows;

FIG. 8 is a fragmentary bottom plan view taken generally along line 8—8 of FIG. 4 in the direction of the arrows;

FIG. 9 is an enlarged fragmentary view taken generally along line 9—9 of FIG. 8 in the direction of the arrows;

FIG. 10 is a fragmentary cross sectional view on an enlarged scale taken generally along line 10—10 of FIG. 1 in the direction of the arrows; and FIG. 11 is a fragmentary sectional view taken generally along line 11—11 of FIG. 2 in the direction of the arrows.

Referring now to the drawings in detail and initially to FIG. 1, reference numeral 10 generally designates a baby carriage constructed in accordance with the present invention. The baby carriage 10 has an attractive appearance simulating that of an antique automobile. The body of the carriage is constructed in two sections, a lower main body 11 and an upper body portion 12.

The main body 11 includes a generally horizontal floorboard 13 (FIG. 4) from which front and rear end panels 14 and 15 extend upwardly. The main body has side walls 16 which taper or converge as they extend forwardly, as best shown in FIG. 3. The extreme forward portions of the side walls converge more sharply than the remainder. The side walls and end panels cooperate to present a hollow, box-like interior within the main body. Running boards 17 project outwardly from the lower central portions of side walls 16, and each side wall has front and rear fenders 18 and 19 which extend from the running boards over front and rear wheels 20 and 21. Simulated headlights 22 are mounted to a rigid rod 23 which extends between the opposite front fenders 18 forwardly of the front panel 14.

The rear wheels 21 rotate on axles 24 (FIG. 1) which project outwardly from the opposite side walls 16. The front wheels 20 are mounted to turn from side to side to permit turning of the carriage. With reference particularly to FIGS. 8 and 9, a rigid mounting strap 25 is secured to the underside of floorboard 13 by bolts 26. The opposite end portions 25a of strap 25 are turned upwardly at locations outwardly of side walls 16, and a vertical sleeve 27 is secured to each end portion 25a of the strap. Bent steering arms 28 have vertical ends which are pivotally received in sleeves 27 and retained therein by pins 27a. Arms 28 extend to the rear below sleeves 27 and rigidly mount horizontal axles 20 on which wheels 20 are journaled. The rearward end portions of arms 28 are interconnected by a tie rod 30 which extends beneath floorboard 13.

Since wheels 20 are located rearwardly of the sleeves 27 in which arms 28 turn, they tend to be oriented in the straight ahead position. The wheels are further urged to the straight ahead position by tension springs 32 which connect at one end to an ear 33 on floor 13 and at the opposite end to lugs 34 on the tie rod 30. The logs are offset on opposite sides of the center of the tie rod. Accordingly, when wheels 20 turn either to the left or right, one of the springs 32 is placed under tension due to the movement of tie rod 30, and the spring tension urges the wheels back to the square or straight ahead position.

The upper body portion 12 includes opposite side walls 36 which directly overlie and essentially form upward continuations of the lower side walls 16 when the upper body portion is in its extended position (FIG. 1). Walls 36 converge somewhat as they extend forwardly (see FIG. 3) and are thus shaped like the portions of wall 16 which they normally overlie. Walls 36 have straight lower edges that are able to rest on top of the straight upper edges of walls 16. Walls 36 have contoured upper edges and their height increases toward the rear, although their maximum height is less than the height of walls 16.

Body portion 12 includes a front panel 37 (FIG. 4) and a crowned hood 38 which extends to the rear from panel 37 and between the upper edges of walls 36 at their forward portions. Panel 37 is essentially an upward continuation of panel 14 when the upper body portion is in its extended position, and the two front panels 14 and 37 cooperate to present a simulated grill on the carriage. A dash panel 39 is turned upwardly from the rearward end of hood 38. A simulated steering wheel 40 is mounted to the dash panel 39, preferably for rotation on a shaft 40a.

A horizontal seat 42 is formed on body portion 12 to extend between the lower edges of side walls 36 at the rearward portions thereof. The seat 42 terminates well to the rear of dash panel 39 such that an open space is presented to receive the legs of an infant seated in the carriage.

Seat 42 is equipped with a back rest 43 which is pivoted thereto by a conventional hinge 44. The back 43 is able to pivot both forwardly to the folded position shown in FIG. 4 and rearwardly to one or more rearwardly inclined positions (one of which is shown in broken lines in FIG. 1). A U-shaped wire bail 45 holds the back in its rearwardly inclined positions. The opposite ends of bail 45 are pivoted to the rear edges of side walls 36. As best shown in FIG. 5, a pair of laterally spaced blocks 46 on the rear surface of backrest 43 are provided with horizontal grooves 46a which are able to receive the cross wire of bail 45 to retain the back rest in a rearwardly inclined position (FIG. 1). There are preferably at least two sets of grooves 46a so that the back rest can be held in at least two inclined positions by bail 45.

Backrest 43 is normally in the nearly upright position shown in solid lines in FIG. 1. With particular reference to FIG. 7, a hollow box member 48 extends horizontally across the rear surface of the backrest below blocks 46. A small pin 49 which is mounted in box 48 is able to turn on its axis, and a lever 50 is carried on the pin. Lever 50 is urged to turn counterclockwise by a tension spring 51 which is hooked at one end to the top portion of the lever and at the other end to a lug 52. A stop 53 engages the lower portion of the lever to limit its counterclockwise rotation to the vertical position shown in FIG. 7. Pin 49 projects out of box 48 and is provided with a handle 54 on its end.

Left and right rods 56 and 57 are hooked at one end to lever 50 respectively above and below its center. The ends of rods 56 and 57 normally project out of the opposite ends of box 48 and into apertured blocks 58 which are mounted on the side walls 36. Rods 56 and 57 retain backrest 43 in its nearly upright position when they are received in blocks 58. Turning of handle 54 clockwise as indicated by the directional arrow in FIG. 7 turns lever 50 and pulls rods 56 and 57 out of blocks 58 to release the backrest, thus permitting it to be folded forwardly or inclined to the rear.

An adjustable headrest 60 (FIG. 5) has downwardly projecting rods 61 which are closely received in openings formed in the top of blocks 46. The headrest is thereby mounted on top of backrest 43, and its elevations may be adjusted by moving it up or down. The tight friction fit of rods 51 retains the headrest in the position to which it is moved.

A removable canopy structure is mounted on vertical poles 62 which are received in openings formed in the top of blocks 58 (see FIG. 5). As shown in FIG. 1, the upper end of each pole pivotally connects with a generally horizontal support arm 63 on which the canopy 64 is mounted. Inclined braces 65 extend between poles 62 and arms 63 to retain the arms in their outwardly extended position in which the canopy is located above seat 42. Braces 65 each comprise a pair of links which are pivoted together at 66 midway along the length of the brace. To store the canopy structure, poles 62 are removed from blocks 58, and braces 65 are folded about pins 66 to collapse or fold arms 63 such that the arms and canopy 64 lie generally along poles 62.

The linkage which connects upper portion 12 with the main body 11 comprises a pair of generally U-shaped rods 68 and 69 which serve as pivot arms for raising and lowering the upper body portion. As best shown in FIG. 5, the forward rod 68 has a pair of parallel legs 68a which are turned outwardly at their lower ends and received for pivotal movement in horizontal sleeves 70 which are secured to the floorboard 13 near its forward end. Rod 68 has an upper cross portion (not shown) which extends horizontally between the upper ends of legs 68a and pivotally through horizontal sleeves 71 which are secured to the front panel 37 of body portion 12.

The other rod 69 is parallel to and spaced behind rod 68. Spaced apart legs 69a of the rearward rod diverge somewhat as they extend upwardly. The lower ends of legs 69a are bent outwardly and received to pivot in horizontal sleeves 72 which are secured near the center of floorboard 13. An upper cross portion 69b extends horizontally between the opposite ends of legs 69a and is pivotally inserted through sleeves 73 which are secured to a channel 73a (FIG. 4) on the underside of seat 42. The effective length of legs 69a is equal to the length of legs 68a.

The lower end of each leg 68a and 69a is located well below and slightly to the rear of its upper end when body portion 12 is in the extended position shown in broken lines in FIG. 4. The weight of portion 12 thus maintains its side walls 36 directly on top of walls 16 as upward continuations thereof. Rods 68 and 69 lie along floor 13 when body portion 12 is lowered to its retracted position within the main body 11. Rods 68 and 69 remain parallel at all times, and body portion 12 is thus maintained horizontal at all times.

A locking pin 74 (FIG. 6) positively secures the upper body portion 12 in its extended upper position. Pin 74 extends downwardly through hood 38 and through an apertured flange 75 that is turned rearwardly from the lower end of panel 37. A compression spring 76 encircles pin 74 and bears upwardly the underside of hood 38 and downwardly against a collar 77 which is secured to the pin. Spring 76 urges the lower end of pin 74 to enter an aperture formed in a boss 78 which is integral with the front panel 14 of the main body. An inclined surface 78a is formed on the rearward portion of boss 78 so that the lower end of pin 74 is able to ride up the inclined surface in camming fashion so as to enter its aperture when body portion 12 is moved toward its upper extended position. The top end of pin 74 carries a ring 79 which projects above hood 38 and which may be pulled upwardly to withdraw pin 74 from boss 78. Ring 79 provides an attractive hood ornament.

The carriage is pushed by means of an elongate, U-shaped handle 80 which is connected to the main body 11. The handle includes parallel side bars 80a which are pivotally connected at their lower ends to the opposite side walls 16. A cross bar 80b extends between the upper ends of bars 80a to serve as a handle bar. With particular reference to FIG. 10, the rearward portion of each side wall 16 has a bracket plate 81 secured thereto, and the lower ends of legs 80a are pivoted to plates 81 by pivot couplings 82. Below coupling 82, each leg 88 carries a spring loaded locking pin 83. A compression spring 84 encircles each pin 83 and engages a collar 83a thereof to urge the pin inwardly. Each plate 81 is provided with an aperture in which pin 83 is received to retain handle 80 in the upwardly and rearwardly extending position shown in FIGS. 1 and 2. Each pin 83 has an enlarged knob 85 on its end by which it can be pulled out of plate 81 so that the handle can be folded into the storage position shown in FIGS. 3 and 4. In the storage position, handle 80 lies substantially along the upper edges of side walls 16 slightly outwardly thereof.

A second seat 86 is pivoted at 87 to a backrest 88. As best shown in FIG. 11, parallel cross rods 89 and 90 extend between legs 80a of the handle in order to mount the second seat assembly. The underside of seat 86 is provided with lugs 91 which have notches that interfit with the lower rod 90. The backrest 88 has side flanges in which L-shaped slots 92 are formed to interfit with the upper rod 89. The connection of logs 91 and slots 92 with the cross rods securely mounts the second seat assembly to handle 80, while permitting it to be easily removed therefrom and folded up for storage purposes.

The carriage is normally used with body portion 12 in the upper extended position shown in FIGS. 1 and 2. Backrest 43 is retained in its nearly upright position, and handle 80 is locked in upward and rearward extension from the main body so that its cross bar 80c may be grasped to push the carriage. The second seat assembly and the canopy structure may also be employed if desired.

When the carriage is to be stored or transported, the upper portion 12 is swung downwardly into the main body 11. As portion 12 is pivoted to the rear on rods 68 and 69, it is initially raised slightly as the rods straighten out to vertical positions. This is best seen with reference to FIG. 4. Due to the forwardly converging nature of side walls 16 and 36 and the rearward movement of body portion 12 before its lower edges again reach the plane of the upper edges of side walls 16, walls 36 are able to clear to the inside of walls 16 as portion 12 moves downwardly and rearwardly within the main body. In its storage position, body portion 12 rests on floor 13 and is located entirely within the main body, and the height of the carriage is less than half its height in the extended position. Backrest 43 is folded forwardly to lie generally along seat 42 as shown in FIG. 4, and handle 80 is folded forwardly such that it lies generally along the main body in a horizontal position. The carriage thus occupies little room and is able to be stored or transported in a relatively small space.

From the foregoing, it will be seen that this invention is one well adapted to attain all ends and objects hereinabove set forth, together will the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A baby carriage comprising:
   a substantially hollow main body having forwardly converging side walls with upper edges;
   a plurality of wheels supporting said main body;
   an upper body portion having forwardly converging side walls with lower edges corresponding to said converging side walls of said main body, said upper body portion further including a seat assembly;
   linkage means coupling said upper body portion with said main body portion for pivotal movement relative thereto between an extended upper position wherein said upper body portion projects above said main body with said lower edges of the upper body portion adjacently overlying said upper edges of the main body and a retracted lower position wherein said upper body portion is disposed substantially within said main body, said linkage means including a pair of substantially parallel pivot arms each having a first end pivotally coupled with said main body and a second end pivotally coupled with said upper body portion, said first end of each arm being located below and to the rear of said second end thereof when said upper body portion is in the extended upper position; and
   releasable means of retaining said upper body portion in the upper position.

2. The invention of claim 1, wherein said seat assembly includes a generally horizontal seat portion and a foldable backrest pivotally coupled thereto, and including means for securing said backrest in a generally upright position.

3. The invention of claim 5, including means for retaining said backrest in a rearwardly inclined position.

4. The invention of claim 1, including a second seat assembly and means for detachably mounting said second seat assembly to said main body.

5. The invention of claim 1, including a canopy structure and means for detachably mounting said canopy structure substantially above said seat assembly.

6. The invention of claim 1, including an elongate handle pivotally coupled with said main body and foldable to lie generally therealong, and releasable means for locking said handle in an upwardly and rearwardly extended position relative to said main body.

7. The invention of claim 6, including a second seat assembly and means for detachably mounting said seat assembly to said handle.

* * * * *